United States Patent
Benkert

(10) Patent No.: US 9,765,847 B1
(45) Date of Patent: Sep. 19, 2017

(54) VIBRATION ISOLATION AND SEISMIC RESTRAINT APPARATUS AND METHODS

(71) Applicant: California Dynamics Corporation, Los Angeles, CA (US)

(72) Inventor: Donald E. Benkert, South Pasadena, CA (US)

(73) Assignee: California Dynamics Corporation, Los Angeles, CA (US)

( * ) Notice: Subject to any disclaimer, the term of this patent is extended or adjusted under 35 U.S.C. 154(b) by 0 days.

(21) Appl. No.: 14/679,762

(22) Filed: Apr. 6, 2015

Related U.S. Application Data

(60) Provisional application No. 61/976,409, filed on Apr. 7, 2014.

(51) Int. Cl.
*F16F 15/04* (2006.01)
*F16F 15/067* (2006.01)

(52) U.S. Cl.
CPC .......... *F16F 15/046* (2013.01); *F16F 15/067* (2013.01)

(58) Field of Classification Search
CPC ...... F16F 15/046; F16F 15/067; F16F 15/173; F16F 15/06; E04H 9/02
USPC ....... 248/638, 624, 623, 613, 578, 575, 573, 248/563, 560, 562; 267/135, 225, 153, 267/284
See application file for complete search history.

(56) References Cited

U.S. PATENT DOCUMENTS

| | | | | |
|---|---|---|---|---|
| 1,734,596 A * | 11/1929 | Rosenzweig | ............. | F16F 7/08 188/129 |
| 2,093,930 A * | 9/1937 | Rosenzweig | ......... | F16F 15/067 248/619 |
| 2,281,955 A * | 5/1942 | Rosenzweig | ........... | F16F 15/06 248/568 |
| 2,289,514 A * | 7/1942 | Mastney | ............... | F16F 15/067 108/136 |
| 2,324,657 A * | 7/1943 | Wales | ................... | F16F 15/067 267/130 |
| 2,439,739 A * | 4/1948 | Hussman | ................. | B41J 29/08 248/578 |

(Continued)

*Primary Examiner* — Muhammad Ijaz
(74) *Attorney, Agent, or Firm* — Khorsandi Patent Law Group, A Law Corporation; Marilyn R. Khorsandi

(57) ABSTRACT

Exemplary embodiments of the present invention would provide an exemplary vibration isolation and seismic restraint apparatus that would comprise: an exemplary structural member comprising: counterposed threaded holes; counterposed layered threaded force-transfer bosses, wherein each of the counterposed layered threaded force-transfer bosses would comprise a threaded hole aligned with a corresponding counterposed threaded hole in said underlying (bottom) member. The exemplary structural member would further comprise: counterposed threaded studs, wherein each of the counterposed threaded studs would be threaded through corresponding threaded holes in the corresponding layered threaded force-transfer boss and corresponding threaded holes in the underlying (bottom) member. The exemplary structural member would further comprise a spring resting on, or attached to, a position on the structural member between the counterposed threaded studs. The exemplary vibration isolation and seismic restraint apparatus would further comprise a housing for the spring.

7 Claims, 11 Drawing Sheets

(56) References Cited

U.S. PATENT DOCUMENTS

| | | | | |
|---|---|---|---|---|
| 3,151,833 | A * | 10/1964 | Thrasher | G01C 19/16 248/562 |
| 4,067,531 | A * | 1/1978 | Sikula | B62D 25/12 123/198 E |
| 4,356,992 | A * | 11/1982 | Benkert | E04H 9/021 248/573 |
| 5,595,371 | A * | 1/1997 | Hukuda | F16F 3/04 267/136 |
| 6,029,942 | A * | 2/2000 | Daddis, Jr. | F04B 39/0044 248/635 |
| 6,374,968 | B1 * | 4/2002 | Noe | B06B 1/14 188/266 |
| 2004/0036002 | A1 * | 2/2004 | Meisel | E04H 9/021 248/638 |
| 2004/0200682 | A1 * | 10/2004 | Herrera | F16F 7/104 188/380 |
| 2006/0254997 | A1 * | 11/2006 | Pellegrino | A47B 47/021 211/195 |
| 2007/0151819 | A1 * | 7/2007 | Schmidt | B65G 69/008 188/377 |
| 2011/0204195 | A1 * | 8/2011 | Stanley | E04D 13/1407 248/224.8 |
| 2011/0240207 | A1 * | 10/2011 | Stanley | E04D 13/1407 156/91 |

* cited by examiner

TOP MEMBER

BOTTOM MEMBER

VIBRATION ISOLATION AND SEISMIC RESTRAINT APPARATUS AND METHODS

CROSS REFERENCE TO RELATED APPLICATIONS

This application claims priority to U.S. Provisional Patent Application Ser. No. 61/976,409, titled "VIBRATION ISOLATION AND SEISMIC RESTRAINT APPARATUS AND METHODS," filed on Apr. 7, 2014, the entire contents and disclosure of which is incorporated herein for all purposes in full by reference as if stated in full herein.

FIELD OF THE INVENTION

The field of the present invention is vibration isolation apparatus and methods, and more particularly, vibration isolation and seismic restraint apparatus and methods.

BACKGROUND OF THE INVENTION

Some equipment, such as, for example, a piece of hospital equipment, when in operation, may vibrate. The mention herein of hospital equipment is illustrative and non-limiting. As will be understood by someone with ordinary skill in the art, the apparatus and methods disclosed herein are not limited by the particular type of equipment that is supported. Reference herein to vibrating equipment will be understood to include any type of equipment, whether now known or in the future discovered, that vibrates, or for which vibration isolation is desired (such as equipment that is sensitive to vibration from other sources).

If a vibrating piece of equipment is set directly on a floor, or a supporting platform, the vibrations caused by the piece of equipment can be transferred to the relevant supporting structure, resulting in noise, or potentially, in transferring undesirable vibrations through the supporting structure to occupants or nearby equipment.

Springs may be used to support vibrating equipment in order to reduce vibrations from that equipment into the supporting structure. As a non-limiting example, springs may be used to support a vibrating piece of hospital equipment in order to reduce noise and/or vibration transfer to any person or thing, including other nearby sensitive equipment.

However, in certain geographic locations where there is geological seismic activity, the use of vibration isolation springs, without seismic restraint, can make the equipment supported by the springs vulnerable to excessive motion, and potential damage, during seismic activity.

Seismic activity, such as an earthquake, or any other activity, such as high wind speeds, where spring-supported equipment is not protected from excess motion damage. Some way is needed to restrain excessive motion of equipment supported on springs so that the supported equipment is not damaged.

Excessive motion of the supported equipment, and damage to the supported equipment, can be prevented by restraining the motion of the supported equipment. In particular, excessive motion and damage to the supported equipment can be prevented by restraining the motion to less than one quarter inch (¼") at the points of protection of the supported equipment.

SUMMARY OF THE INVENTION

Exemplary embodiments of the present invention would provide restraint of motion of the supported equipment. Exemplary embodiments of the present invention would provide layered force-transferring bosses that transfer or distribute forces created by excessive motion of spring-supported equipment.

Exemplary embodiments of the present invention would provide an exemplary vibration isolation and seismic restraint apparatus that would comprise an exemplary structural member. In the exemplary embodiment, the exemplary structural member would comprise an exemplary underlying (bottom) structural member and would bear on its upper surface, one or more exemplary layered threaded force-transfer bosses (which may also sometimes be referred to herein as "force-distributing" bosses) as described further below. However, reference herein to an underlying (bottom) structural member (or sometimes synonymously referred to herein as an underlying (bottom) member, or as an exemplary lower structural member) is illustrative and non-limiting. In alternative exemplary embodiments, without departing from the spirit of the present invention, an alternative exemplary structural member could comprise an overlying (top) structural member that bears on its lower surface one or more exemplary layered threaded force-transfer bosses. In yet further alternative exemplary embodiments, without departing from the spirit of the present invention, a further alternative exemplary structural member could comprise a lateral (side) structural member that bears on one of its side surfaces (e.g., a side that is perpendicular or at any other angle other than parallel to the ground) one or more exemplary layered threaded force-transfer bosses.

Continuing with a description of the exemplary embodiment, the exemplary underlying (bottom) structural member would comprise: counterposed threaded holes; counterposed layered threaded force-transfer bosses, wherein each of the counterposed layered threaded force-transfer bosses would comprise a threaded hole aligned with a corresponding counterposed threaded hole in said underlying (bottom) member. The exemplary underlying (bottom) member would further comprise: counterposed threaded studs, wherein each of the counterposed threaded studs would be threaded through corresponding threaded holes in the underlying (bottom) member and the corresponding layered threaded force-transfer boss. The exemplary underlying (bottom) member would further comprise a spring resting on, or attached to, a position on the underlying (bottom) member between the counterposed threaded studs. The exemplary vibration isolation and seismic restraint apparatus would further comprise a housing for the spring.

In one exemplary embodiment, the exemplary housing would further comprise distal ends with holes (for grommets) that would be aligned with and attached to the threaded studs.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

One way to restrain excessive motion of spring-supported equipment, and thereby prevent damage of the equipment, would be to restrain motion of the supported the equipment.

A further way to restrain excessive motion of spring-supported equipment, and thereby prevent damage of the equipment, would be to absorb and/or cushion forces created by excessive motion of spring-supported equipment.

Before describing exemplary embodiments of the present invention, a brief description of an exemplary prior embodiment is given below in order to provide a perspective of improvements experienced with exemplary embodiments of the present invention, which will be described subsequent to the description of the exemplary prior embodiment.

Exemplary Prior Embodiment

Figure 1:
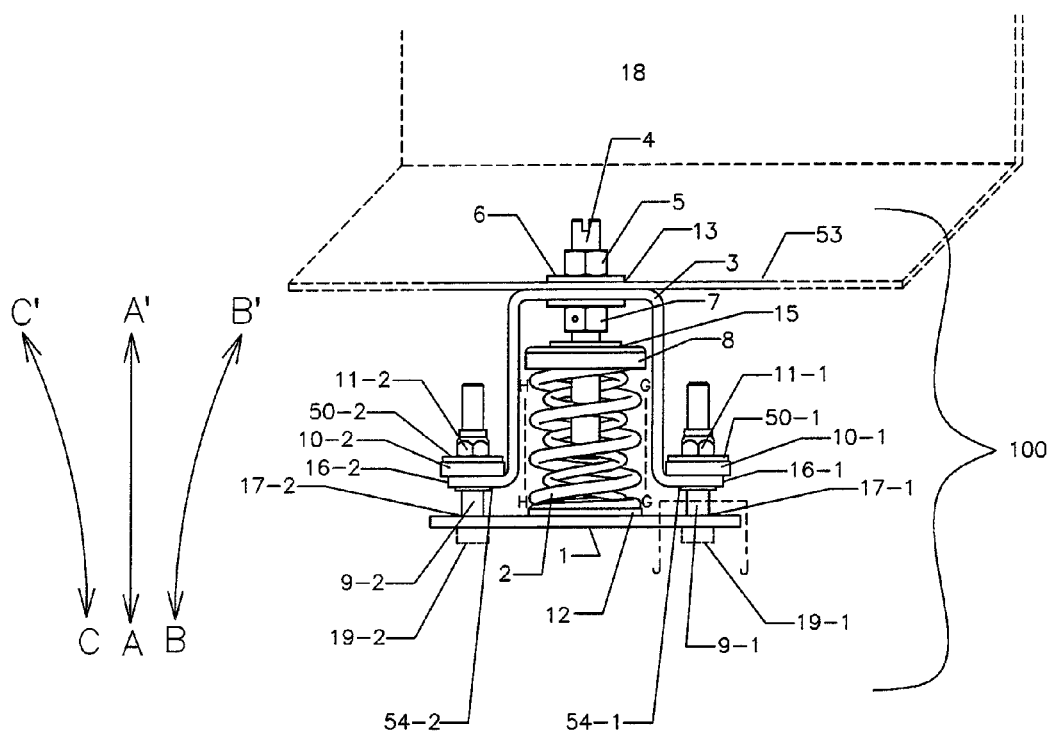
FIG. 1 depicts a front plan view of an exemplary prior vibration isolation and seismic restraint apparatus.

FIG. 1 depicts a front plan view of an exemplary prior vibration isolation and seismic restraint apparatus 100 (sometimes referred to herein as "exemplary prior assembly 100"). The exemplary prior assembly 100 depicted in FIG. 1 would comprise an exemplary top spring-housing member 3 that houses an exemplary spring 2 that rests on an exemplary pad 12 that rests on an exemplary lower structural member 1. Exemplary distal ends 16-1 and 16-2 of exemplary top spring-housing member 3 would each have holes 54-1 and 54-2 which would be aligned with, and through which exemplary threaded studs 9-1 and 9-2 extend; exemplary locknuts 11-1 and 11-2, exemplary washers 50-1 and 50-2, and exemplary rubber grommets 10-1 and 10-2 would be fastened over the exposed ends of threaded studs 9-1 and 9-2 to cage the threaded studs 9-1 and 9-2 in the aligned holes 54-1 and 54-2 in exemplary distal ends 16-1 and 16-2. Exemplary threaded studs 9-1 and 9-2 would be threaded through exemplary threaded holes 17-1 and 17-2 respectively in exemplary lower structural member 1.

As will be understood by someone with ordinary skill in the art, the description herein of exemplary threaded studs is illustrative and non-limiting.

As depicted in FIG. 1, an exemplary slotted stud 4 (for load transfer and locking would be fastened through an exemplary opening 13 in exemplary top spring-housing member 3 using exemplary locknut 5, exemplary pinned nut 7 and exemplary insert 6. As further depicted in FIG. 1, the exemplary slotted stud 4 would further be fastened through an exemplary spring cup 8 through an exemplary opening 15 in the exemplary spring cup 8 threaded after spring 2 is properly adjusted by turning stud 4, locknut 5 and washer 6. Exemplary slotted stud 4 would invite a power tool to turn stud 4 and compress spring 2.

Figure 2:
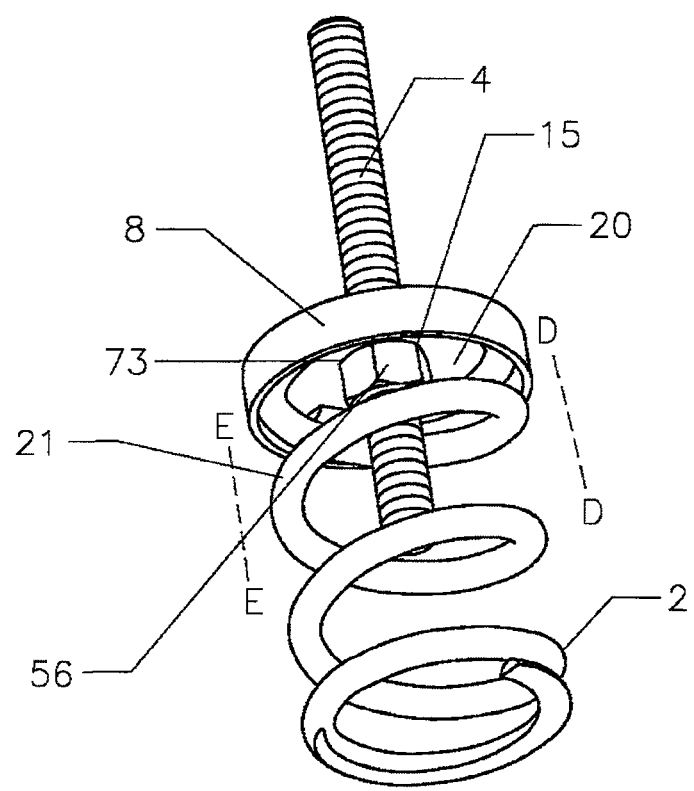
FIG. 2 depicts an exemplary perspective view of an exemplary spring cup and spring.

FIG. 2 depicts an exemplary perspective view of an exemplary spring cup 8 with nut 56 tack-welded 73 to provide female threading to receive threaded stud 4. FIG. 2 depicts an exemplary interior underside 20 of exemplary spring cup 8. FIG. 2 also depicts an exemplary upper end 21 of exemplary spring 2. As depicted by exemplary lines D-D and E-E, the exemplary upper end 21 of exemplary spring 2 would fit into the exemplary interior underside 20 of exemplary spring cup 8.

With reference to FIG. 1, as will be understood by someone with ordinary skill in the art, exemplary slotted stud 4 would be placed through a hole (not shown) in a flange 53 of an exemplary piece of equipment 18. Depending on the size or weight of the exemplary piece of equipment 18, more than one exemplary prior assembly 100 would be placed in various positions attached to the flange 53 of the exemplary piece of equipment 18. For example, under an exemplary piece of equipment 18 that is generally rectangular or square from an upper plan view, an exemplary prior assembly 100 could be placed under the exemplary piece of equipment 18 near each of the four structurally sound corners of the rectangular or square piece of equipment.

As will be understood by someone with ordinary skill in the art, the at-rest weight of the exemplary piece of equipment 18 resting on an exemplary bearing surface of exemplary spring-housing member 3 would result in an at-rest pressure by stud 4 on exemplary spring cup 8 on the exemplary upper end 21 of exemplary spring 2 (see FIGS. 1 and 2).

As will be further understood by someone with ordinary skill in the art, normal vibration of exemplary piece of equipment 18 would tend to exert upward and downward forces along exemplary directional force line A-A' and any other directional forces (such as, for example, forces along exemplary directional lines B-B' and/or C-C'). It will be understood by someone with ordinary skill in the art that under exemplary upward and/or downward forces along exemplary directional force line A-A', exemplary spring 2 would compress and decompress normally within an upward and downward column of motion conceptually depicted in FIG. 1 by lines G-G and H-H.

As compared to normal vibration of the exemplary piece of equipment 18, seismic activity such as an earthquake, or other above-normal vibration of the exemplary piece of equipment, could cause stronger upward and/or downward forces along exemplary vertical directional force line A-A', as well as stronger horizontal forces along exemplary directional lines B-B' and/or C-C'.

As will be understood by someone with ordinary skill in the art, discussion herein of exemplary forces along exemplary directional lines B-B' and/or C-C' is illustrative; forces along other directional lines (along principle horizontal axes X (see element 85 depicted in FIG. 6) and Z (see element 87 depicted in FIG. 6), and vertical axis Y (see element 86 depicted in FIG. 6)) could be experienced by the exemplary components of the exemplary prior assembly 100 and/or by the exemplary embodiments of the present invention described further below.

Figure 3:
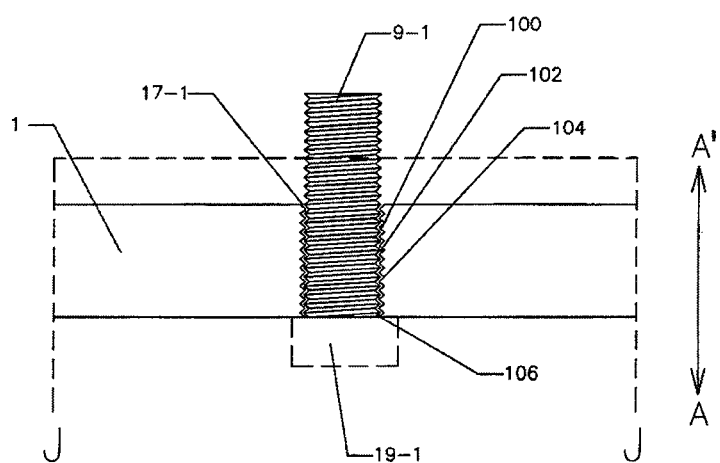
FIG. 3 depicts an exemplary partial cut-away (along cut-away line J-J depicted in FIG. 1) side plan view showing an exemplary threaded stud experiencing an upward force along generally vertical directional line A-A'.
Figure 4:
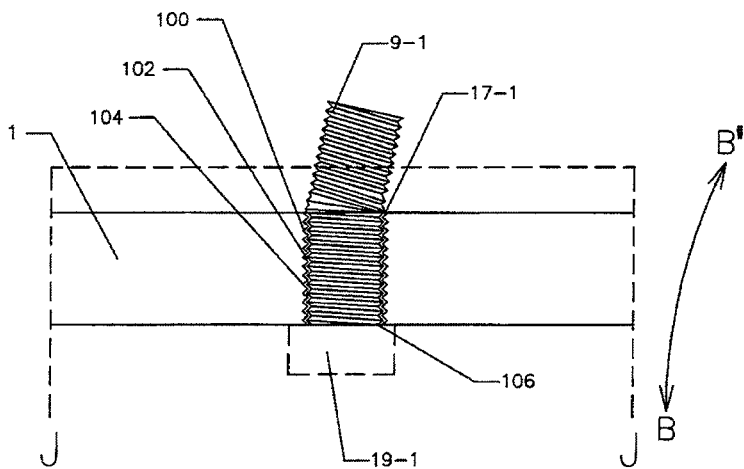
FIG. 4 depicts an exemplary partial cut-away (along cut-away line J-J depicted in FIG. 1) side plan view showing an exemplary threaded stud experiencing a generally upward force along directional line B-B'.
Figure 5:
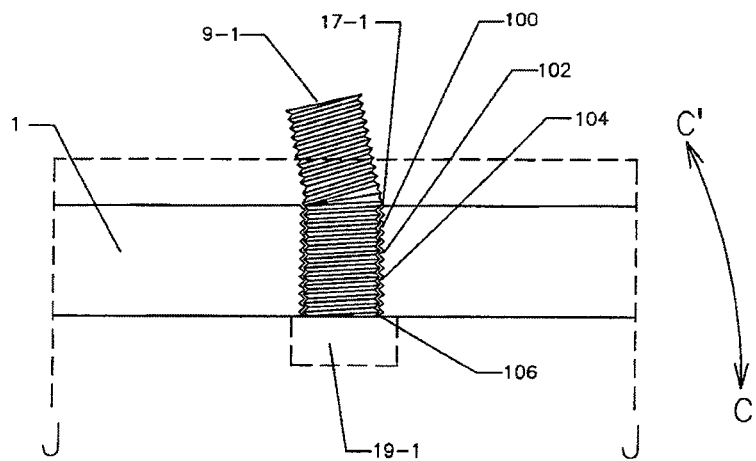
FIG. 5 depicts an exemplary partial cut-away (along cut-away line J-J depicted in FIG. 1) side plan view showing an exemplary threaded stud experiencing a generally upward force along directional line C-C'.

Continuing with a description of exemplary prior assembly 100, FIG. 3 depicts an exemplary partial cut-away (along cut-away line J-J depicted in FIG. 1) front plan view of a portion of exemplary lower structural member 1, showing exemplary threaded stud 9-1 threaded through exemplary threaded hole 17-1, and further showing exemplary threaded stud 9-1 experiencing an upward force along vertical directional line A-A'. FIG. 4 depicts an exemplary partial cut-away (along cut-away line J-J depicted in FIG. 1) front plan view of a portion of exemplary lower structural member 1, showing exemplary threaded stud 9-1 threaded through exemplary threaded hole 17-1, and further showing exemplary threaded stud 9-1 experiencing a generally lateral force along directional line B-B'. FIG. 5 depicts an exemplary partial cut-away (along cut-away line J-J depicted in FIG. 1) side plan view of a portion of exemplary lower structural member 1, showing exemplary threaded stud 9-1 threaded through exemplary threaded hole 17-1, and further showing exemplary threaded stud 9-1 experiencing a generally upward force along directional line C-C'.

As will be understood by someone with ordinary skill in the art, the load of the upward forces depicted along exemplary directional lines A-A', B-B' and C-C' in FIGS. 3, 4 and 5 would be distributed with the strongest upward load on the uppermost thread 100; with lesser load on the next-lower thread 102; with even less load on the next-lower thread 104; and with the lowest load on the lowest thread 106. Depending on the strength of the force, the upward forces depicted along exemplary directional lines A-A', B-B' and C-C' in FIGS. 3, 4 and 5 could cause structural deterioration of threads of exemplary stud 9-1, or could potentially cause all engaged threads of exemplary stud 9-1 to fail, starting with the uppermost thread 100.

Figure 6:
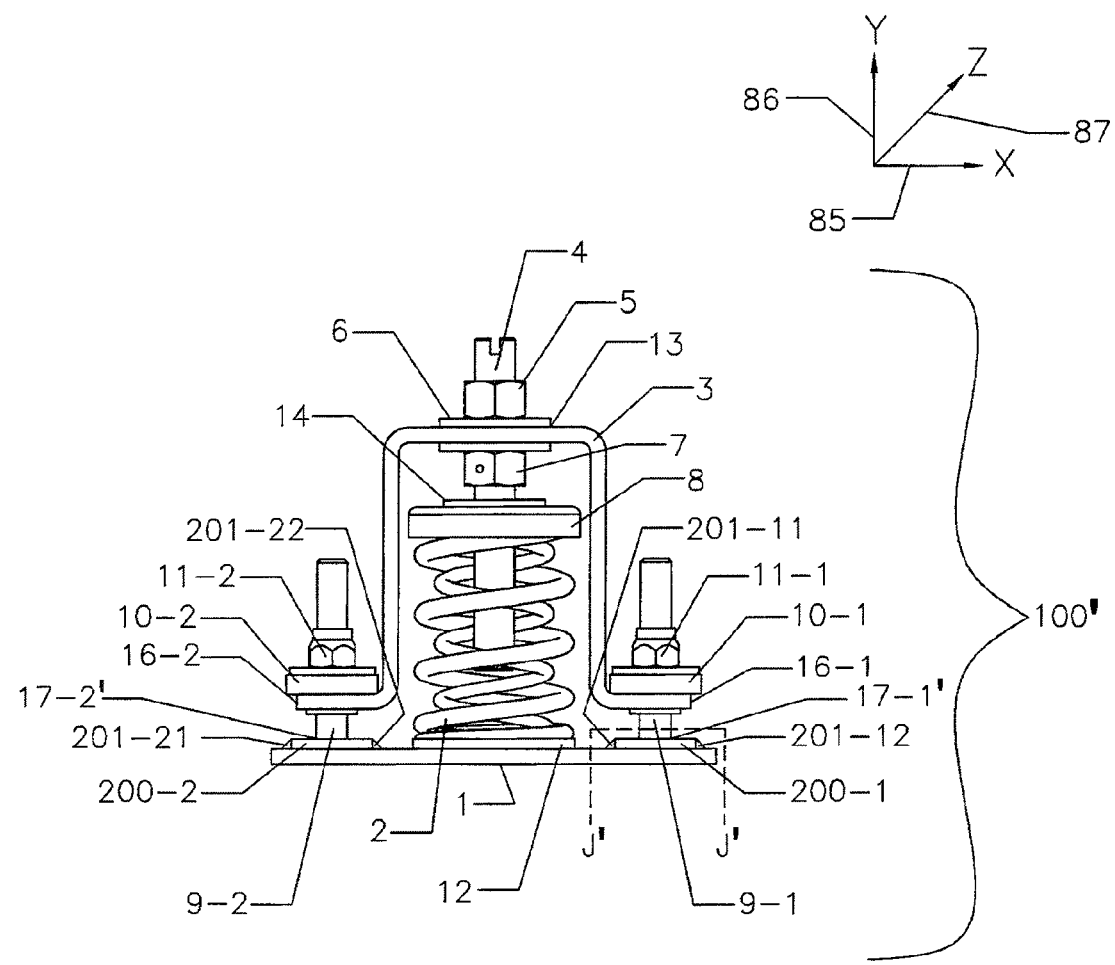
FIG. 6 depicts an exemplary front plan view of a simplified exemplary embodiment of a vibration isolation and seismic restraint apparatus that comprises an exemplary layered threaded force-transfer boss in an exemplary embodiment of the present invention.

Simplified Exemplary Embodiment of Exemplary Layered Force-Transfer Apparatus and Methods FIG. 6 depicts an exemplary front plan view of a simplified exemplary embodiment of a vibration isolation and seismic restraint apparatus 100' (sometimes referred to herein as "exemplary assembly 100'") that embodies two counterposed exemplary layered threaded force-transfer bosses (e.g., exemplary bosses 200-1 and 200-2); two sides of each exemplary layered threaded force-transfer boss (e.g., exemplary bosses 200-1 and 200-2) in the simplified exemplary embodiment of a vibration isolation and seismic restraint apparatus 100' depicted in FIG. 6 would be welded to exemplary lower structural member 1 at exemplary welding lines 201-11 and 201-12 (welding exemplary layered threaded force-transfer boss 200-1 to exemplary lower structural member 1), and 201-21 and 201-22 (welding exemplary layered threaded force-transfer boss 200-2 to exemplary lower structural member 1). Two counterposed threaded studs (e.g., 9-1 and 9-2) would be threaded through threaded holes in the corresponding exemplary layered threaded force-transfer bosses 200-1 and 200-2 and through the corresponding exemplary lower structural member 1.

As will be understood by someone with ordinary skill in the art, the discussion herein of an exemplary layered force-transfer boss (e.g., element numbers 200-1 and 200-2) refers to a boss that comprises a layer that is separate from the exemplary lower structural member 1. In particular, in the exemplary embodiment, the exemplary layered force-transfer boss (e.g., element numbers 200-1 and 200-2) would only be fastened to the exemplary lower structural member 1 by welding at each end; other than the exemplary welding at each end, the bottom surface of each exemplary layered force-transfer boss (e.g., element numbers 200-1 and 200-2) would not be fastened to the top surface of the exemplary lower structural member 1.

It would be possible, in alternative embodiments, to use layered force-transfer bosses of alternative shapes, sizes and/or thicknesses without departing from the spirit of the present invention. As will be discussed further below, a "bowing" action where the surface of the layered force-transfer boss that faces the surface of the member to which it is attached, would bow away by tensile force from the surface of the member to which it is attached; the bowing action of the layered force-transfer boss will transfer force from the threads of the stud near/at the top surface of the layered force-transfer boss top threads to the threads of the stud that are near/at the top surface of the member to which the layered force-transfer boss is attached, which results in an improved strength of the apparatus. It will be understood by someone with ordinary skill in the art that such layered force-transfer bosses could be used in further alternative embodiments where the layered force-transfer boss would be on an underside or lateral side of a structural member. In such alternative embodiments, the layered force-transfer boss would be fastened on the surface of the member that resists a tension force on a stud threaded through the member (where the tensile force is directed away from the member).

Figure 7:
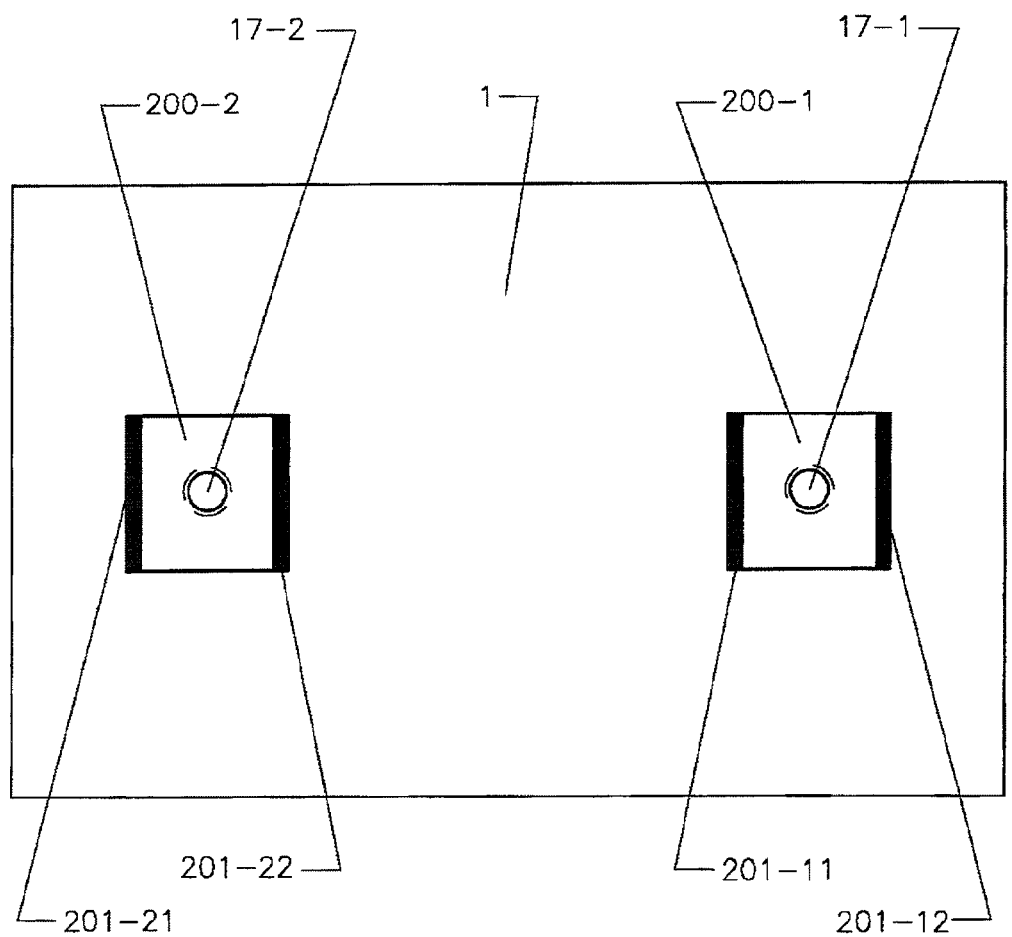
FIG. 7 depicts an exemplary top plan view of two exemplary counterposed layered threaded force-transfer bosses in an exemplary embodiment of the present invention.

FIG. 7 depicts an exemplary top plan view of exemplary layered threaded force-transfer bosses 200-1 and 200-2 welded along exemplary welding lines 201-11, 201-12 and 201-21, 201-22 respectively. As depicted in FIG. 7, each exemplary layered threaded force-transfer bosses 200-1 and 200-2 comprises a threaded hole 17-1' and 17-2' respectively.

Figure 8:
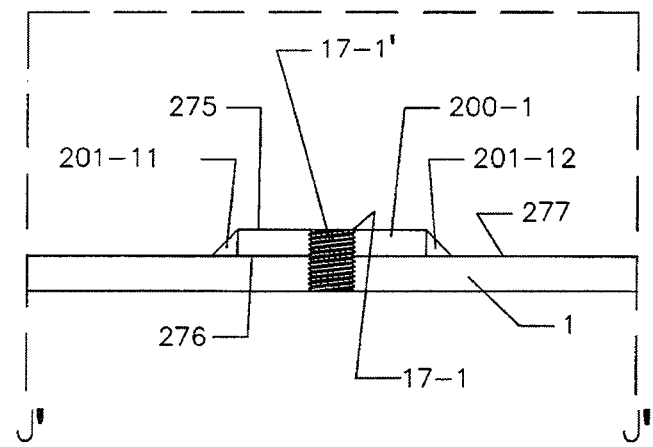
FIG. 8 is an exemplary partial cut-away (along cut-away line J'-J' depicted in FIG. 6) front plan view of an exemplary layered threaded force-transfer boss welded (along exemplary counterposed welding lines) to a portion of exemplary lower structural member in an exemplary embodiment of the present invention.

FIG. 8 is an exemplary partial cut-away (along cut-away line J'-J' depicted in FIG. 6) front plan view of exemplary layered threaded force-transfer boss 200-1 welded (along exemplary welding lines 201-11, 201-12) to a portion of exemplary lower structural member 1; FIG. 8 further depicts exemplary threaded hole 17-1 in exemplary lower structural member 1 and exemplary threaded hole 17-1' in exemplary layered threaded force-transfer boss 200-1. As depicted in FIG. 8, exemplary layered threaded force-transfer boss 200-1 is welded (along exemplary welding lines 201-11, 201-12) to a portion of exemplary lower structural member 1. In the exemplary embodiment, exemplary layered threaded force-transfer boss 200-1 and exemplary lower structural member 1 are then drilled and tapped to create exemplary threaded hole 17-1' in exemplary layered threaded force-transfer boss 200-1 and exemplary threaded hole 17-1 in exemplary lower structural member 1 thereby providing exemplary threaded hole 17-1 that is aligned with, and of a unitary size as, exemplary threaded hole 17-1.

As will be understood by someone with ordinary skill in the art, tapping the assembled layered threaded force-transfer boss 200-1 that has been welded (e.g., along exemplary welding lines 201-11, 201-12) to a portion of exemplary lower structural member 1, and drilling holes through both the boss 200-1 and the member 1, would thereby provide continuous threading through exemplary layered threaded force-transfer boss 200-1 and exemplary lower structural member 1. Further, tapping the assembled layered threaded force-transfer boss (e.g., 200-1 and 200-2) that have been welded to exemplary lower structural member 1, and drilling holes through both the relevant boss (e.g., 200-1 and 200-2) and through the exemplary lower structural member 1, would result in exemplary threaded holes 17-1' and 17-2' in the exemplary layered threaded force-transfer bosses 200-1 and 200-2 that are sized and threaded to accommodate receiving a threaded stud of a mateable unitary size and threading as are the corresponding threaded holes in the exemplary lower structural member 1 (e.g., threaded holes 17-1 and 17-2).

As will be further understood by someone with ordinary skill in the art, the discussion herein of welding layered force-transfer bosses to a structural member is an exemplary way of fastening the bosses to the structural member. Other ways of fastening the layered force-transfer bosses to the structural member could be used without departing from the spirit of the present invention. For example, the layered force-transfer bosses could be fastened to the structural member with screws, bolts, rivets, glue, and any other means of fastening whether now known or in the future discovered.

Figure 9:
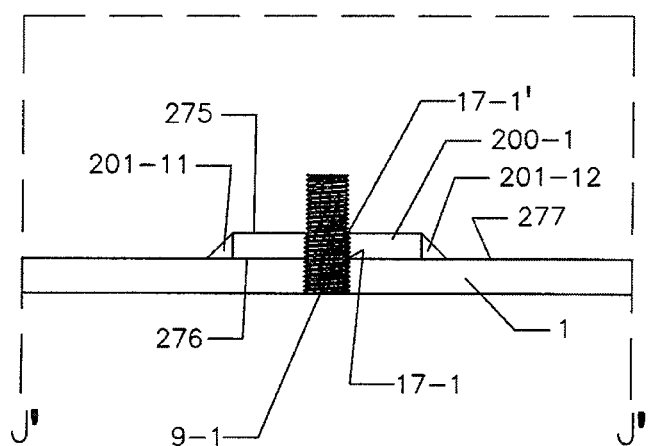
FIG. 9 depicts an exemplary partial cut-away (along cut-away line J'-J' depicted in FIG. 6) front plan view showing an exemplary threaded stud threaded through both an exemplary threaded hole in an exemplary layered threaded force-transfer boss and through an exemplary threaded hole in an exemplary lower structural member in an exemplary embodiment of the present invention.

FIG. 9 depicts an exemplary partial cut-away (along cut-away line J'-J' depicted in FIG. 6) front plan view showing exemplary threaded stud 9-1 threaded through both exemplary threaded hole 17-1' in exemplary layered threaded force-transfer boss 200-1 and exemplary threaded hole 17-1 in exemplary lower structural member 1.

Figure 10A:
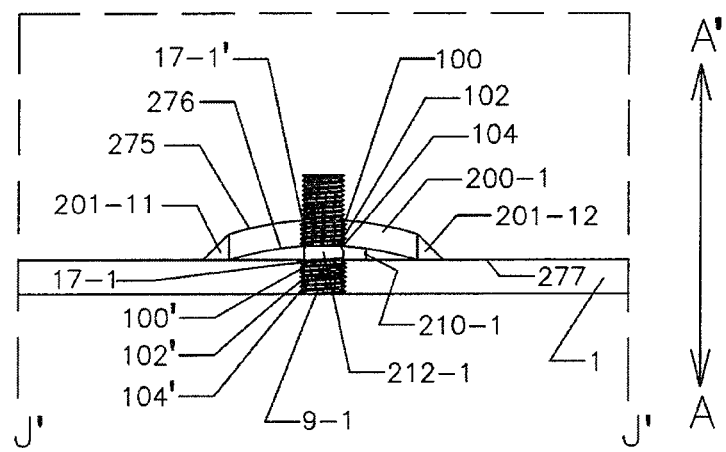
FIG. 10A depicts an exemplary partial cut-away (along cut-away line J'-J' depicted in FIG. 6) front plan view of a portion of exemplary lower structural member, an exemplary layered threaded force-transfer boss, and an exemplary threaded stud threaded through exemplary threaded holes in the exemplary lower structural member and the exemplary layered threaded force-transfer boss, and further depicting the exemplary threaded stud experiencing an upward force along generally vertical directional line A-A' bowing the layered force-transfer boss, causing a gap between the exemplary layered threaded force-transfer boss and the exemplary lower structural member, in an exemplary embodiment of the present invention.

FIG. 10A depicts an exemplary partial cut-away (along cut-away line J'-J' depicted in FIG. 6) front plan view of a portion of exemplary lower structural member 1, exemplary boss 200-1, and exemplary stud 9-1 threaded through exemplary threaded holes 17-1 and 17-1'; FIG. 10A further depicts exemplary threaded stud 9-1 experiencing an upward force along generally vertical directional line A-A'.

In the exemplary embodiment, the exemplary threaded studs (e.g., stud 9-1) would be locked in place with thread-locking material. As will be understood by someone with ordinary skill in the art, thread-locking material resists extraction by twisting of the threads of locked item (e.g., stud 9-1) but would not add strength with respect to tension forces exerted on the locked item.

As will be understood by someone with ordinary skill in the art, the exemplary studs 9-1 and 9-2 (see e.g., FIG. 6) of the exemplary simplified assembly 100' may experience both vertical and horizontal forces. The exemplary studs 9-1 and 9-2 experiencing both vertical (tensile) and horizontal (shear) forces is sometimes referred to in the art as "combination loading."

As will be understood by someone with ordinary skill in the art, mention herein of "horizontal" forces will refer to "shear" forces; mention of "vertical" forces will refer to "tensile" forces.

In FIG. 10A, the respective upward forces are depicted as causing the exemplary boss 200-1 to bow slightly, creating an exemplary small gap 210-1. The exemplary creation of exemplary small gap 210-1 would essentially create two sets of threads that could be characterized as uppermost threads 100 and 100' respectively; two sets of threads that could be characterized as next-lower threads 102 and 102'; and two sets of threads that could be characterized as next-lower threads 104 and 104'.

Creation of the aforementioned two sets of each thread category would cause a transfer of force load distribution—that is, instead of the uppermost thread 100 experiencing an extreme force load all by itself, the two sets of uppermost threads 100 and 100' would share the load. That is, as depicted in FIG. 10A, by layering the exemplary boss (e.g., boss 200-1) onto the lower structural member 1 with welding (e.g., 201-11 and 201-12 depicted in FIGS. 8-10A) at each end of the boss, when a threaded stud (that has been threaded through both exemplary threaded hole 17-1' in exemplary layered threaded force-transfer boss 200-1 and exemplary threaded hole 17-1 in exemplary lower structural member 1) experiences a vertical force that pulls away (which in FIG. 10A is depicted as an upward force along directional line A-A') from the external surface (depicted in FIGS. 8-10A as surface 275) of the boss, the portion of the boss (depicted in FIGS. 8-10A as surface 276) that is not attached to the lower structural member 1 (at a surface illustratively depicted in FIGS. 8-10A as surface 277 of the lower structural member 1) would bow away from the surface 277 of the lower structural member 1, resulting in a bowing of the exemplary boss.

As will be understood by someone with ordinary skill in the art, the exemplary depiction in the Figures of a rectangular boss (e.g., 200-1 and 200-2) is illustrative and not limiting. Rather, in alternative embodiments, alternatively-shaped bosses could be used. Further, although a rectangular boss is illustratively depicted as being welded at two of its edges, alternative welding or fastening could be done. As an illustrative example, point welding at more than one points around the perimeter of the boss could be done—the alternative welding should still result in the above-described bowing effect. As a further illustrative example, an alternatively-shaped boss, e.g., an octagonal-shaped boss, or a round boss, could be fastened (e.g., welded) on more than one of its edges to the underlying structural member.

Some tests indicate that the uppermost thread 100 would experience a force greater than would be experienced by thread 100'. However, due to the above-described bowing effect of the layered force-transfer boss (e.g., 200-1 and 200-1), some of the force would be transferred to the second uppermost thread 100'.

Some tests have shown that the exemplary welding of edges of exemplary boss 200-1 to exemplary lower structural member 1 results in a dramatic increase (in some tests, nearly double) in strength to the overall assembly 100', and in particular, to the sub-assembly of the exemplary stud 9-1 threaded through exemplary threaded holes 17-1' and 17-1.

Figure 10B:
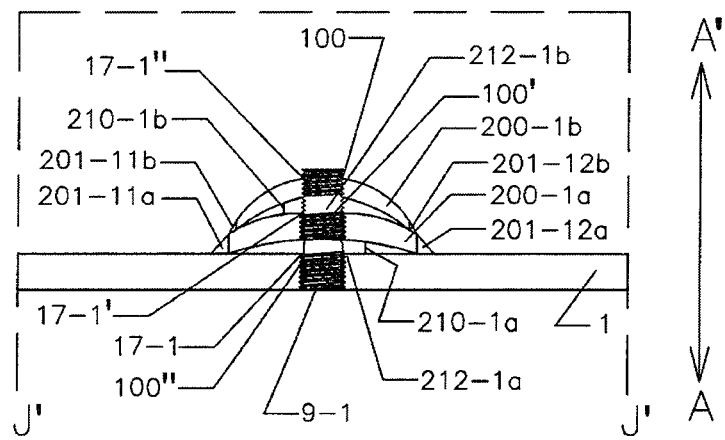
FIG. 10B depicts an exemplary partial cut-away (along cut-away line J'-J' depicted in FIG. 6) front plan view of a portion of an alternative exemplary embodiment that provides multiple threaded force-transfer bosses welded to an exemplary structural member.

As will be understood by someone with ordinary skill in the art, the above-described use of a single-layer exemplary layered, threaded force-transfer boss is illustrative and exemplary and is not a limitation of the present invention. Rather, it would be possible in alternative embodiments to use multiple layered, threaded force-transfer bosses, such as in the alternative exemplary multi-layered-boss embodiment depicted in FIG. 10B. In particular, FIG. 10B depicts an exemplary partial cut-away (along cut-away line J'-J' depicted in FIG. 6) front plan view of a portion of exemplary lower structural member 1, exemplary boss 200-1a, exemplary boss 200-1b, and exemplary stud 9-1 threaded through exemplary threaded holes 17-1, 17'1' and 17-1"; FIG. 10B further depicts exemplary threaded stud 9-1 experiencing an upward force along generally vertical directional line A-A'.

Exemplary multiple layered threaded force-transfer bosses 200-1a and 200-1b are depicted in FIG. 10B as being welded along exemplary welding lines 201-11a and 201-11b, and 201-12a and 201-12b respectively.

In FIG. 10B, the respective upward forces are depicted as causing the exemplary boss 200-1a to bow slightly, creating an exemplary small gap 210-1a; and are further depicted as causing the exemplary boss 200-1b to bow slightly, creating an exemplary small gap 210-1b. The exemplary creation of exemplary small gaps 210-1a and 210-1b would essentially create three sets of threads that could be characterized as uppermost threads 100, 100' and 100" respectively.

As will be understood by someone with ordinary skill in the art, the addition of multiple layered, threaded force transfer bosses would increase the strength of the apparatus. However, there would be a point of diminishing returns with regard to the number of such layers.

Figure 11:
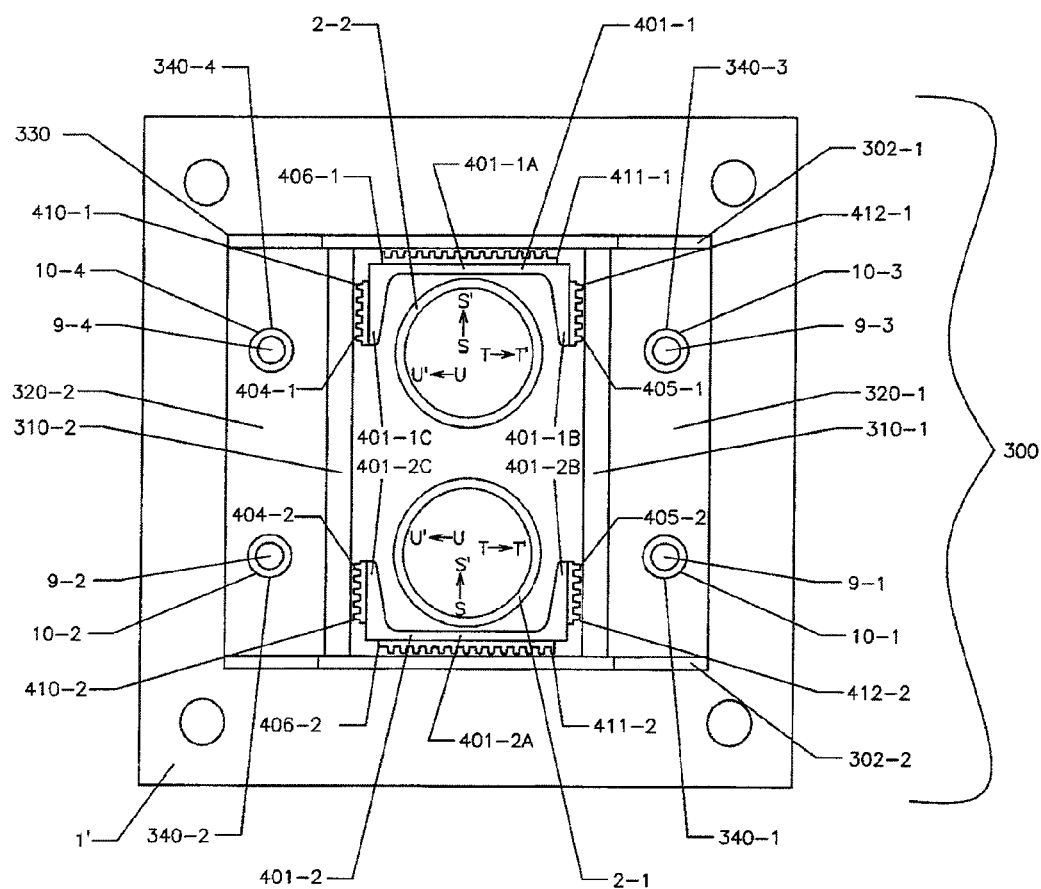
FIG. 11 depicts a top plan view of a partially assembled alternative exemplary embodiment of a vibration isolation and seismic restraint apparatus in an exemplary alternative embodiment of the present invention.

Alternative Exemplary Embodiment of Exemplary Layered Force-Transfer Apparatus and Methods FIG. 11 depicts a top plan view of a partially assembled alternative exemplary embodiment of a vibration isolation and seismic restraint apparatus 300. An exemplary top plate (element 301 in FIG. 12) has not been applied to the top of the exemplary assembly 300 depicted in FIG. 11 so that the exemplary top plan view exposes components in the interior of exemplary assembly 300.

Figure 15:
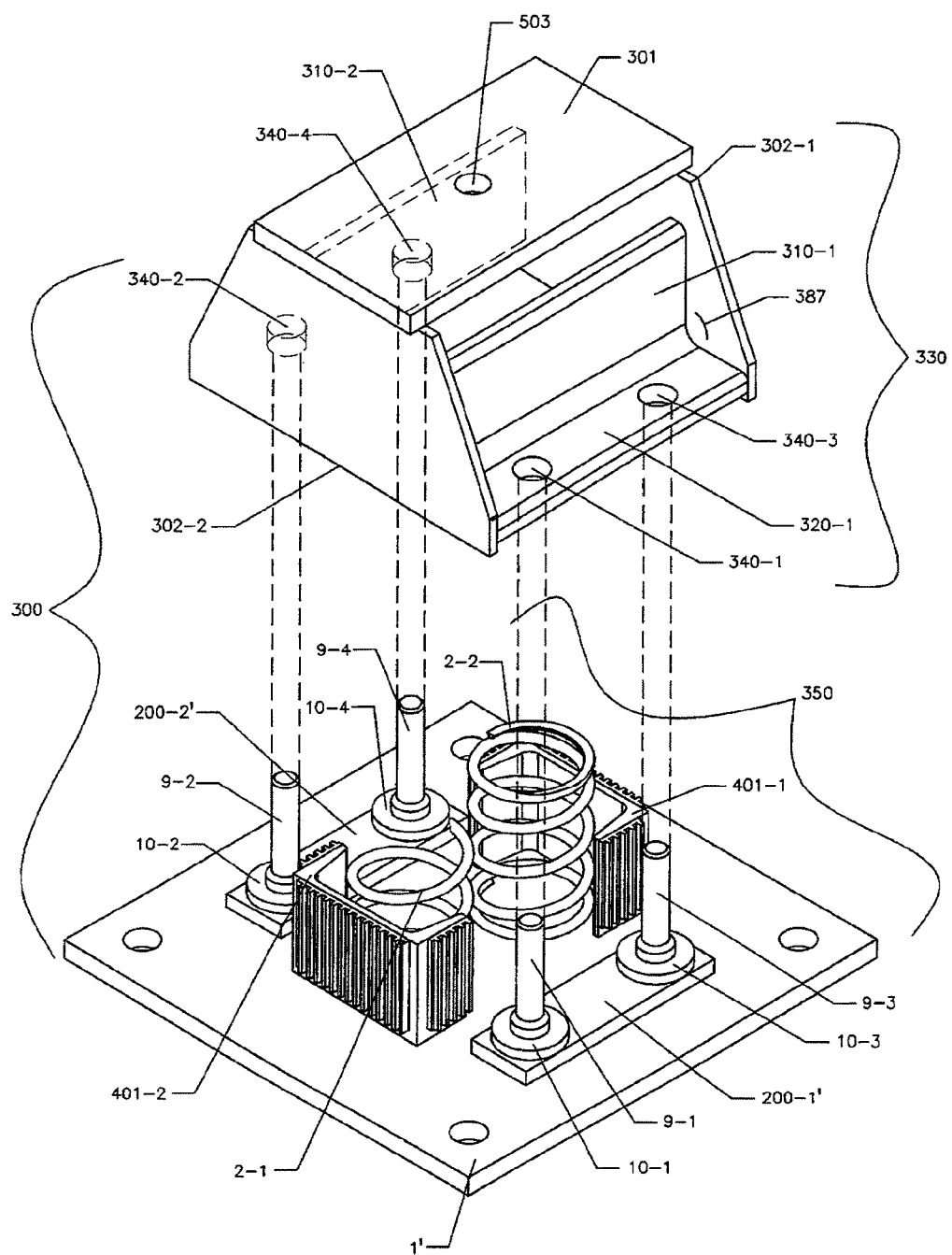
FIG. 15 depicts an exemplary perspective exploded view of an alternative exemplary embodiment of a vibration isolation and seismic restraint apparatus 300.

FIG. 15 depicts an exemplary perspective exploded view of an alternative exemplary embodiment of a vibration isolation and seismic restraint apparatus 300:

As depicted in FIG. 11 (and see also FIG. 15), as compared to the exemplary assembly 100' previously described above and depicted in FIG. 6, the aforementioned alternative embodiment assembly 300 would comprise: two exemplary springs 2-1 and 2-2; and four exemplary studs 9-1-9-4 and corresponding rubber grommets 10-1-10-4. Alternative embodiment assembly 300 further comprises two horizontal-motion restraints 401-1 and 401-2.

As with the simplified embodiment 100' previously described above, it will be understood by someone with ordinary skill in the art, that the description herein of exemplary threaded studs 9-1-9-4 is illustrative and non-limiting.

As compared to the exemplary assembly 100' previously described above and depicted in FIG. 6, as will be understood by someone with ordinary skill in the art, the two exemplary horizontal motion restraints 401-1 and 401-2 of exemplary assembly 300 depicted in FIG. 11 (and see also FIG. 15) will restrain horizontal motion (in all directions) of the exemplary top member 330 in relation to the exemplary bottom member 350. In particular, as depicted in FIG. 11, the two exemplary horizontal motion restraints 401-1 and 401-2 would be provided within small clearances from the exemplary top member 330. In particular, exemplary small clearances 411-1 and 411-2 would be provided between the respective restraints 401-1 and 401-2 and the corresponding exemplary respective shear wall 302-1 and 302-2 (sometimes also referred to herein as "structural panels" and/or "structural-motion-interfering panels") of the exemplary top member 330; exemplary small clearances 410-1 and 410-2 would be provided between the respective restraints 401-1 and 401-2 and the corresponding exemplary angled side panel 310-2; and exemplary small clearances 412-1 and 412-2 would be provided between the respective restraints 401-1 and 401-2 and the corresponding exemplary angled side panel 310-1.

As will be understood by someone with ordinary skill in the art, the above-described exemplary restraints 401-1 and 401-2 in combination with the exemplary springs 2-1 and 2-2 and the exemplary top member 330 would "float" the exemplary top member 330. As will be understood by someone with ordinary skill in the art, the above-described floating of the exemplary top member would similarly "float" the equipment supported by the alternative exemplary embodiment 300.

Further, as will be understood by someone with ordinary skill in the art, the above-described exemplary restraints 401-1 and 401-2 in combination with the exemplary springs 2-1 and 2-2 and the exemplary top member 330 would prevent combination loading of the exemplary threaded studs 9-1 through 9-4 in the alternative exemplary embodiment 300. In particular, the above-described exemplary restraints 401-1 and 401-2 in combination with the exemplary top member 330 (and see also FIG. 15) would prevent horizontal (shear) forces from being exerted on exemplary threaded studs 9-1 through 9-4 in the alternative exemplary embodiment 300. That is, because the two exemplary horizontal motion restraints 401-1 and 401-2 would restrain horizontal movement of exemplary top member 330, then exemplary studs 9-1-9-4 would experience, to a substantial extent, only vertical (tensile, i.e. upward) forces.

As will be understood by someone with ordinary skill in the art, threading a threaded stud with a plurality of threads into a structural member will engage the threads with the mating threads of the structural member. If the threaded stud is subjected to tensile force that attempts to withdraw the threaded stud from the structural member without unscrewing the threaded stud, the tensile force will eventually cause the failure of either the threads or the body of the threaded stud. When the threads fail, all of the threads will fail abruptly, starting with the most heavily loaded thread, which will be the first thread below the surface of the structural member.

Where a headless threaded stud is used, the description herein of a layered, threaded force-transfer boss welded at two opposite edges to the structural member maximizes the tensile force needed to cause the failure of the threads of the stud. Tests indicate that the tensile force that would be required to cause the failure of the threads of a stud with a herein-disclosed layered, threaded, force-transfer boss, approaches a doubling as compared to the tensile force required to cause the failure of the threads of the stud where no boss is provided. However, as will be understood by someone with ordinary skill in the art, the tensile force required to cause the failure of the threads is limited by the body of the stud. That is, at the point where the force is sufficient to cause the body of the stud to fail, then there can be no further benefit from a layered, threaded, force-transfer boss.

Figure 12:
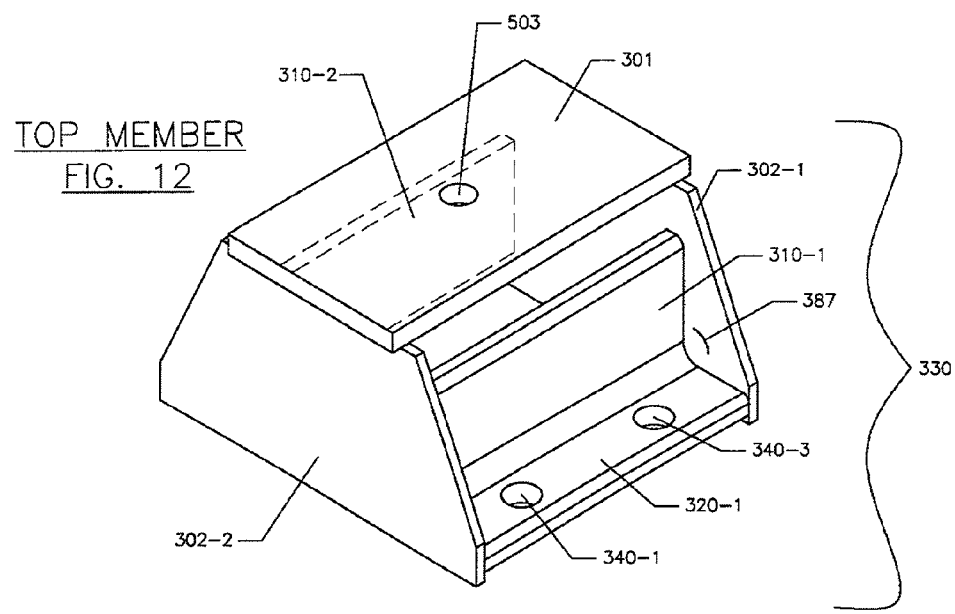
FIG. 12 depicts an exemplary perspective view of an exemplary top member 330 of the alternative assembly in an exemplary alternative embodiment of the present invention.

FIG. 12 depicts an exemplary perspective view of an exemplary top member 330 of the alternative assembly 300. As depicted in FIG. 12 (and see also FIG. 15), the exemplary top member 330 would comprise an exemplary top plate 301 that would be welded to, or otherwise attached to, top ends of exemplary opposing shear wall members 302-1 and 302-2 (sometimes referred to herein as exemplary shear panels 302-1 and 302-2; sometimes also referred to herein as "structural panels" and/or "structural-motion-interfering panels"). In the exemplary embodiment, exemplary shear panels 302-1 and 302-2 comprise trapezoidal panels.

As further depicted in FIG. 12, the exemplary top member 330 would further comprise exemplary opposing angle end panels 310-1 and 310-2. Exemplary opposing angle end panels 310-1 and 310-2 would comprise an angle end (see element 387 depicted in FIG. 12) and would further comprise opposing exemplary distal ends 320-1 (and 320-2 depicted in FIG. 11) with holes 340-1, 340-3 (and 340-2 and 340-4 as depicted in FIG. 11; see also FIG. 15) that fit over, and through which, the distal ends of exemplary studs 9-1-9-4 would be provided (and see also FIG. 15). Opposing ends of exemplary angle end panels 310-1 and 310-2 (sometimes also referred to herein as "structural angles" 310-1 and 310-2) would be welded to, or otherwise attached to, opposing exemplary shear panels 302-1 and 302-2.

Figure 13:
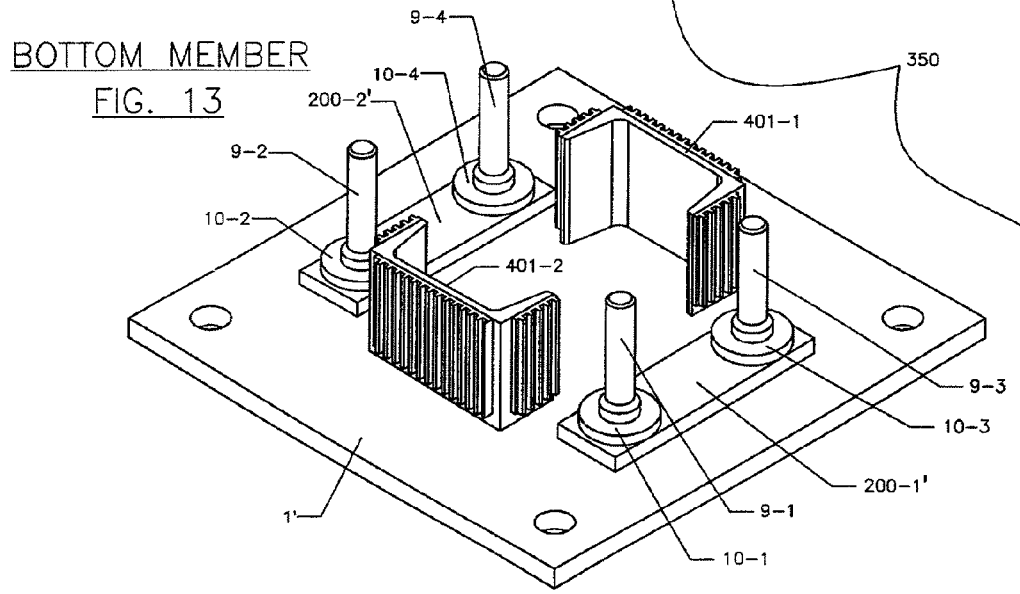
FIG. 13 depicts an exemplary perspective view of an exemplary bottom member in an exemplary alternative embodiment of the present invention.

FIG. 13 depicts an exemplary perspective view of an exemplary bottom member 350. As depicted in FIG. 13, exemplary bottom member 350 would comprise two exemplary horizontal motion restraints 401-1 and 401-2 welded to, or otherwise attached to, alternative exemplary lower structural member 1'. As further depicted in FIG. 13, exemplary bottom member 350 would further comprise exemplary threaded studs 9-1-9-4 threaded through threaded holes (not expressly depicted) in alternative exemplary layered threaded force-transfer bosses 200-1' and 200-2' and corresponding threaded holes (not expressly depicted) in alternative exemplary lower structural member 1'.

Figure 14:
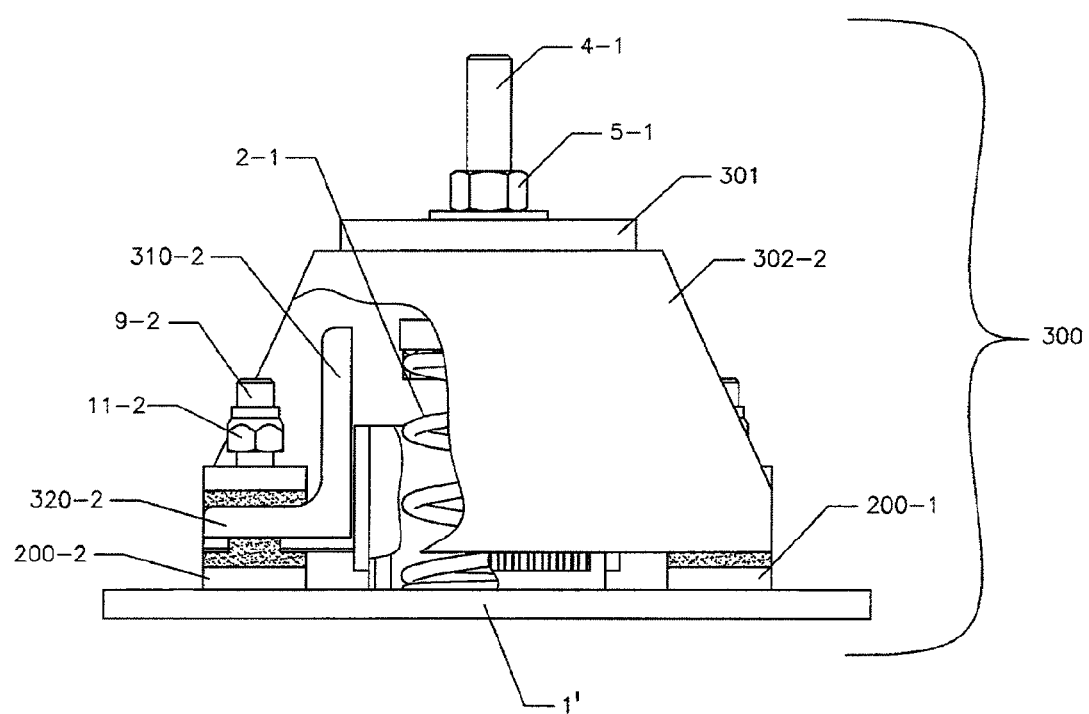
FIG. 14 depicts an exemplary partial cutaway side plan view of the alternative assembly showing the top and bottom members assembled in an exemplary alternative embodiment of the present invention.

FIG. 14 depicts an exemplary partial cutaway front plan view of the alternative assembly 300 showing the top and bottom members assembled.

Returning with reference to FIG. 11, exemplary horizontal motion restraints 401-1 and 401-2 would be three-sided as depicted in FIG. 11. Each exemplary horizontal motion restraint would comprise three sides (e.g., exemplary horizontal motion restraint 401-1 would comprise exemplary sides 401-1a, 401-1b and 401-1c; exemplary horizontal motion restraint 401-2 would comprise exemplary sides 401-2a, 401-2b and 401-2c).

Each exterior side of exemplary horizontal motion restraints 401-1 and 401-2 would comprise a rubber cushion with a small clearance from the respective wall of the exemplary top member. For example, as depicted in FIG. 11, an exemplary exterior of side 401-1a would comprise an exemplary small cushion 406-1 that would have an exemplary small clearance 411-1 from exemplary shear panel 302-1 of the exemplary top member 330. Exemplary exterior of side 401-1b would comprise an exemplary small cushion 405-1 that would have an exemplary small clearance 412-1 from exemplary angle end panel 310-1 of the exemplary top member 330. Exemplary exterior of side 401-1c would comprise an exemplary small cushion 404-1 that would have an exemplary small clearance 410-1 from exemplary angle end panel 310-2 of the exemplary top member 330.

As will be understood by someone with ordinary skill in the art, side-to-side motion of exemplary top member 330 in a direction along the directional line S-S' would be restrained by exemplary exterior side 401-1a and corresponding exemplary small cushion 406-1; depending on the strength of the force, exemplary exterior side 401-1a and corresponding exemplary small cushion 406-1 could compress across the corresponding exemplary small clearance 411-1 into exemplary shear panel 302-1 of the exemplary top member 330.

As will be understood by someone with ordinary skill in the art, the description herein of an exemplary small clearance is illustrative. In alternative embodiments, zero clearance could be provided between the relevant small cushion and the relevant wall of the top member 330 without departing from the spirit of the present invention.

Continuing with reference to FIG. 11, end-to-end motion of exemplary top member 330 in a direction along the directional line T-T' would be similarly restrained by exemplary exterior of side 401-1b and corresponding exemplary small cushion 405-1; depending on the strength of the force, exemplary exterior side 401-1b and corresponding exemplary small cushion 405-1 could compress across the corresponding exemplary small clearance 412-1 into exemplary angle end wall 310-1 of the exemplary top member 330.

Similarly, end-to-end motion of exemplary top member 330 in a direction along the directional line U-U' would be similarly restrained by exemplary exterior side 401-1c and corresponding exemplary small cushion 404-1; depending on the strength of the force, exemplary exterior side 401-1c and corresponding exemplary small cushion 404-1 could compress across the corresponding exemplary small clearance 410-1 into exemplary angle end wall 310-2 of the exemplary top member 330.

As will be understood by someone with ordinary skill in the art, exemplary counterposed horizontal motion restraint 401-2 would work similarly to restrain motions by top member 330 along directional lines S'-S, T-T' and U-U'. For example, motion of exemplary top member 330 in a direction along the directional line S'-S would be restrained by exemplary exterior side 401-2a and corresponding exemplary small cushion 406-2; depending on the strength of the force, exemplary exterior side 401-2a and corresponding exemplary small cushion 406-2 could compress across the corresponding exemplary small clearance 411-2 into exemplary shear wall 302-2 of the exemplary top member 330.

Continuing with reference to FIG. 11, motion of exemplary top member 330 in a direction along the directional line T-T' would be similarly restrained by exemplary exterior of side 401-2b and corresponding exemplary small cushion 405-2; depending on the strength of the force, exemplary exterior side 401-2b and corresponding exemplary small cushion 405-2 could compress across the corresponding exemplary small clearance 412-2 into exemplary side wall 310-1 of the exemplary top member 330.

Similarly, motion of exemplary top member 330 in a direction along the directional line U-U' would be similarly restrained by exemplary exterior side 401-1c and corresponding exemplary small cushion 404-1; depending on the strength of the force, exemplary exterior side 401-1c and corresponding exemplary small cushion 404-1 could compress across the corresponding exemplary small clearance 410-2 into exemplary side wall 310-2 of the exemplary top member 330.

As depicted in FIGS. 11 and 15, the depicted alternative exemplary embodiment of a vibration isolation and seismic restraint apparatus 300 would combine the features previously described above regarding exemplary layered threaded force-transfer bosses (e.g., exemplary bosses 200-1' and 200-2'), plus the above-mentioned exemplary shear walls 302-1 and 302-2, as well as the above-described exemplary three-sided horizontal motion restraints 401-1 and 401-2. However, as will be understood by someone with ordinary skill in the art, further alternative embodiments could use a selection of the aforementioned features with benefit of those particular features, without departing from the spirit of the present invention.

Facsimile Reproduction of Copyright Material

A portion of the disclosure of this patent document contains material which is subject to copyright protection by the copyright owner, California Dynamics Corporation and/or Donald E. Benkert, and their respective successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A vibration isolation and seismic restraint apparatus comprising:
   an underlying structural member comprising:
      counterposed threaded studs, each of said counterposed threaded studs, inserted up through a bottom of said underlying structural member, and connected to said underlying structural member at counterposed stud positions on said underlying structural member,
      at least one spring resting on a top surface of said underlying structural member;
   an upper equipment-supporting housing and a four-cornered, lower member positioned on the underlying structural member;
   said upper equipment-supporting housing comprising a four-sided housing for said at least one spring, and further comprising a plurality of structural angle end panels, each structural angle end panel of said plurality of structural angle end panels comprising a lower distal end, each of said lower distal end of each structural angle end panel comprising counterposed vertical holes, said counterposed vertical holes of said lower distal end aligned over a plurality of said counterposed threaded studs, and attached over said counterposed threaded studs with nuts, washers and shock cushions to restrain upward motion of said upper equipment-supporting housing, said upper equipment-supporting housing surrounding said at least one spring; and
   said four-cornered, lower member comprising a plurality of counterposed cushioned vertical standing structural horizontal motion restraints welded to said top surface of said underlying structural member, each counterposed cushioned vertical standing structural horizontal motion restraint of said plurality of counterposed cushioned vertical standing structural horizontal motion restraints positioned at respective counterposed horizontal restraint positions between one of said at least one spring and at least a portion of said upper equipment-supporting housing thereby restraining horizontal motions by said equipment-supporting housing, each counterposed cushioned vertical standing structural horizontal motion restraint of said plurality of counterposed cushioned vertical standing structural horizontal motion restraints comprising an interior side that faces at least one spring of said at least one spring, and further comprising an exterior cushioned side;
   said upper equipment-supporting housing of said apparatus further comprising a plurality of structural-motion-limiting panels, said four-cornered, lower member inserted up into said upper equipment-supporting housing such that each structural-motion-limiting panel of said plurality of structural-motion-limiting panels is counterposed to a corresponding counterposed cushioned vertical standing structural horizontal motion restraint, each structural-motion-limiting panel of said plurality of structural-motion-limiting panels comprising an interior side that faces the exterior cushioned side of said corresponding counterposed cushioned vertical standing structural horizontal motion restraint, each structural-motion-limiting panel of said plurality of structural-motion-limiting panels fastened to a respective lateral end of at least one structural angle end panel of said plurality of structural angle end panels.

2. The vibration isolation and seismic restraint apparatus of claim 1, wherein a portion of a structural-motion-limiting panel of said plurality of structural-motion-limiting panels extends beyond said lower distal end of a corresponding structural angle end panel.

3. The vibration isolation and seismic restraint apparatus of claim 1, wherein each counterposed cushioned vertical standing structural horizontal motion restraint of said plurality of counterposed cushioned vertical standing structural horizontal motion restraints comprises a three-sided, at least two-cornered cushioned vertical standing structural horizontal motion restraint.

4. The vibration isolation and seismic restraint apparatus of claim 1, said upper equipment-supporting housing of said apparatus further comprising:
   a top member, said top member comprising at least one first hole;
   a stud placed through said at least one first hole in said top member, said stud further placed through a flange hole in a bottom flange of a piece of equipment for vibration isolation and seismic restraint, said stud fastened to said bottom flange of said piece of equipment thereby fastening said apparatus to an underside of said piece of equipment.

5. A vibration isolation and seismic motion limiting apparatus comprising:
   an underlying structural member comprising a top surface;

a plurality of counterposed threaded studs fastened to said underlying structural member at counterposed positions, each of said counterposed threaded studs comprising a respective upward distal end extending upward from said top surface of said underlying structural member;

at least one spring resting on said top surface of said underlying structural member;

a four-cornered lower member and a four-sided, four-cornered upper equipment-supporting housing;

said four-cornered lower member comprising a plurality of substantially C-shaped counterposed cushioned vertical standing structural horizontal motion restraints welded to said top surface of said underlying structural member, said four-cornered, lower member further comprising four top corners, said at least one spring located within a space defined between said top four corners;

said four-sided, four-cornered upper equipment-supporting housing comprising four corners, and further comprising a plurality of structural-motion-limiting panels;

said four-cornered lower member inserted up into said upper equipment-supporting housing such that each of said structural-motion-limiting panels is counterposed to a corresponding substantially C-shaped counterposed cushioned vertical standing structural horizontal motion restraint;

said four-sided, four-cornered upper equipment-supporting housing positioned over said four-cornered, lower member, said four-sided, four-cornered upper equipment-supporting housing further comprising a plurality of structural angle end panels, each structural angle end panel of said plurality of structural angle end panels comprising a lower distal end, each said lower distal end of each structural angle end panel comprising counterposed vertical holes, each said counterposed vertical hole of said lower distal end aligned over a respective upward distal end of a respective counterposed threaded stud of said plurality of counterposed threaded studs, and attached over said respective upward distal end of said respective counterposed threaded stud to restrain upward motion of said four-sided, four-cornered upper equipment-supporting housing;

wherein said at least one spring is positioned within a space defined between the top corners of the four-cornered lower member.

6. The vibration isolation and seismic motion limiting apparatus of claim 5, said vibration isolation and seismic motion limiting apparatus further comprising:

a top member, said top member comprising at least one first hole;

a stud placed through said at least one first hole in said top member, said stud further placed through a flange hole in a bottom flange of a piece of equipment for vibration isolation and seismic restraint, said stud fastened to said bottom flange of said piece of equipment thereby fastening said apparatus to an underside of said piece of equipment.

7. A vibration isolation and seismic motion limiting apparatus comprising:

an underlying structural member comprising a top surface;

at least one spring resting on said top surface of said underlying structural member;

a lower member and an upper equipment-supporting housing;

the lower member comprising a plurality of counterposed cushioned vertical standing structural horizontal motion restraints welded to said top surface of said underlying structural member, each of said counterposed cushioned vertical standing structural horizontal motion restraints separated from each other counterposed cushioned vertical standing structural horizontal motion restraint, each of said counterposed cushioned vertical standing structural horizontal motion restraints comprising at least one exterior corner, said lower member further comprising four interior corners, said at least one spring located within a space defined between said four interior corners;

said upper equipment-supporting housing further comprising a plurality of structural-motion-limiting panels;

said lower member positioned up into said upper equipment-supporting housing such that each structural-motion-limiting panel of said plurality of structural-motion-limiting panels is counterposed to a corresponding counterposed cushioned vertical standing structural horizontal motion restraint;

a plurality of counterposed threaded studs fastened to said underlying structural member at counterposed positions, each of said counterposed threaded studs comprising a respective upward distal end extending upward from said top surface of said underlying structural member;

said upper equipment-supporting housing positioned over said lower member, said upper equipment-supporting housing further comprising a plurality of structural angle end panels, each structural angle end panel of said plurality of structural angle end panels comprising a lower distal end, each said lower distal end of each structural angle end panel comprising at least one vertical hole, each said vertical hole of said lower distal end aligned over a respective upward distal end of a respective counterposed threaded stud of said plurality of counterposed threaded studs, and attached over said respective upward distal end of said respective counterposed threaded stud to restrain upward motion of said upper equipment-supporting housing.

\* \* \* \* \*